C. D. OLSON.
FISH STOP.
APPLICATION FILED JUNE 20, 1918.

1,302,839.

Patented May 6, 1919.

INVENTOR
Clair D. Olson

UNITED STATES PATENT OFFICE.

CLAIR D. OLSON, OF FARMINGTON, NEW MEXICO.

FISH-STOP.

1,302,839. Specification of Letters Patent. Patented May 6, 1919.

Application filed June 20, 1918. Serial No. 241,030.

*To all whom it may concern:*

Be it known that I, CLAIR D. OLSON, a citizen of the United States, residing at Farmington, in the county of San Juan and State of New Mexico, have invented certain new and useful Improvements in Fish-Stops, of which the following is a specification.

This invention is a fish stop or screen which is to be placed at the head of an irrigation stream to prevent fish from passing thereinto.

Another object of this invention is the production of a fish stop or screen which is constructed so as to intermittently permit refuse of various kinds, which may be carried by the stream to pass therethrough into the ditch, although the fish which may also be in the stream will be prevented from passing through the device into such ditch.

Another object of this invention is the production of a fish stop wherein a plurality of screens are pivotally supported upon the frame, each screen being normally retained in a set position by coil springs connected thereto, whereby the water may flow through the screens and when a certain amount of refuse has been lodged against the screens they will swing to open positions and permit the trash to pass therethrough, although another guard screen is provided for preventing fish passing through the device when the screens move to open positions Another object of this invention is the production of a fish stop which includes a frame having a plurality of screens hingedly mounted thereon, together with means for normally retaining the same in set positions, one screen being adapted to allow the trash normally carried on the surface of the water to pass thereover, the guard screen at this time extending in a horizontal position, to prevent fish from swimming through with the trash, although when the lower screens are in open positions, the guard screen will be swung down into a substantially vertical plane for preventing fish from passing through the device.

Broadly stated, the invention consists of a frame having horizontally extending supporting bars extending therethrough, screens pivotally mounted upon said bars, springs connected to said screens for normally retaining the same in vertical positions, thus permitting water to pass therethrough, although preventing fish and refuse to be carried therethrough, said screens being adapted to swing to substantially horizontal planes when a quantity of refuse is lodged thereagainst, thus permitting the trash or refuse to pass through the frame, a normally horizontally extending guard screen carried by one of said bars, said guard screen being connected to one of the first mentioned screens, whereby the guard screen will prevent fish from passing through the top screen when the same opens, said guard screen being adapted to swing to substantially vertical position when the lower screens are opened, thus permitting the trash to pass through the lower portions of the frame, although fish will be prevented from swimming through the device at such time.

One practical form of construction and assembly of the present invention will be hereinafter described and is illustrated in the accompanying drawing, in which—

In the preferred embodiment of the present invention, about to be described, it will be seen that the frame consists of a base 5 having side walls 6 extending vertically therefrom and in parallel relation with respect to each other. As illustrated in the accompanying drawing, the frame is disclosed as formed of cement or other plastic material, although of course, it may be formed of wood, metal or any other suitable construction without departing from the spirit of the present invention. Thus it will be seen that the frame is substantially U-shaped in construction, as illustrated in Fig. 1 and for this reason may be placed within the mouth of a stream or ditch for supporting the screens to be hereinafter described.

The horizontally extending supporting bars 7 and 8 are carried by the side walls 6 and it will also be noted that the top plate 9 is also carried by the upper ends of these walls.

Figure 1:
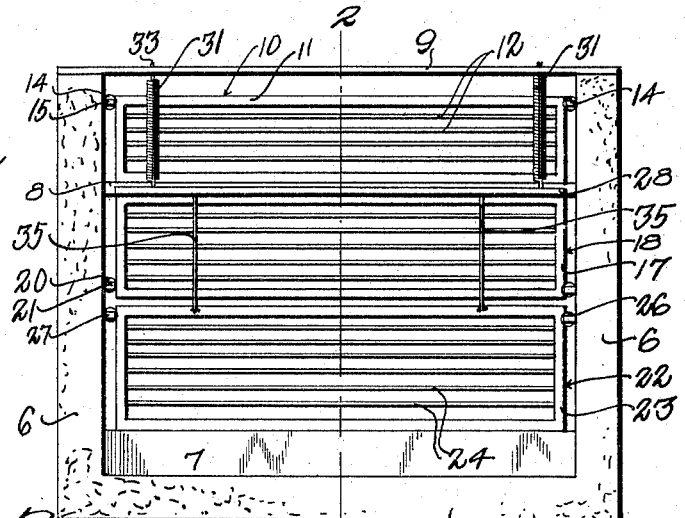
Figure 1 is a front elevation of the fish stop.
Figure 2:
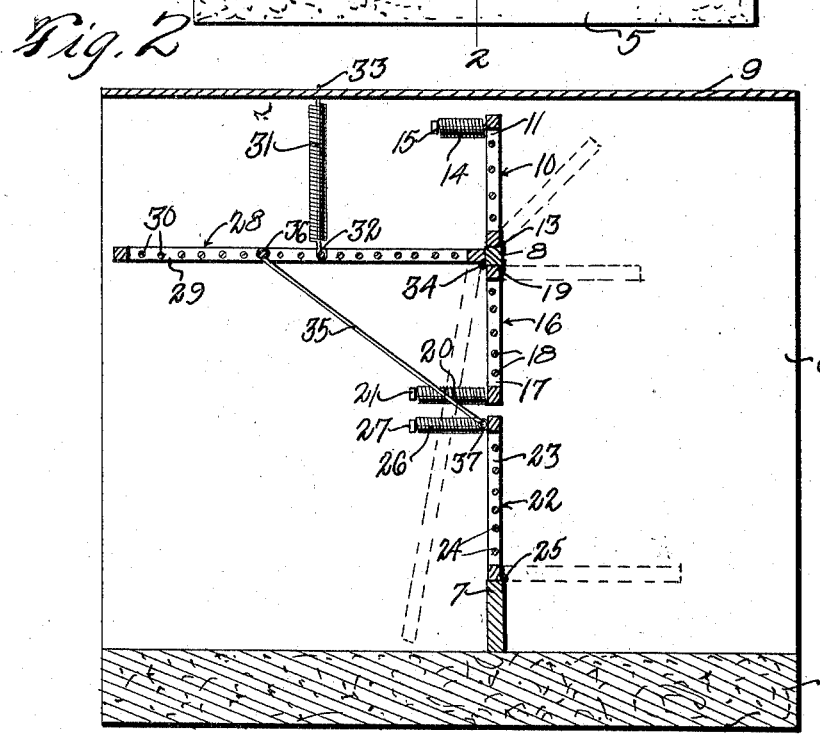
Fig. 2 is an enlarged central vertical section through the device, taken on the line 2—2 of Fig. 1.

The top screen 10 consists of a substantially rectangular frame 11, as shown clearly in Fig. 1, and this frame 11 is provided with the bars 12 for preventing the passage of refuse through the screen. It is of course obvious that if so desired, mesh or any other suitable filtering material of sufficient strength to withstand the usage of the present invention may be employed in place of the bars 12, as the bars are merely illustrated to show the operation of the present invention and the device is not limited to this specific form of filtering means. The frame 11 is hingedly mounted at 13 upon the upper horizontally extending bar 8 and it will be noted that the engagement of the frame 11 with the bar will limit the movement of the frame in one direction, as shown in Fig. 2. Thus it will be seen that the screen 10 extends above the upper supporting bar 8 and projects toward the plate 9.

In order to normally urge this screen in one direction coil springs 14 are connected to the screen 10 and also to lugs 15 carried by the side walls 6 of the main frame of the fish stop. Accordingly, it will be noted that the resiliency of the coil springs will normally urge the screen 10 in one direction to cause the same to be normally projecting in a vertical plane, although it is obvious that when a sufficient pressure is brought to bear upon this screen it will be swung over toward a horizontal plane as suggested by the manner of movement in the dotted lines in Fig. 2.

The middle screen 16 consists of a rectangular frame 17 and cross bars 18 connected thereto, thus causing the middle screen to be substantially similar to the top screen 10. This middle screen 16 may be hinged as indicated at 19 to the supporting bar 8 and it will be noted that this middle screen depends below the supporting bar and normally in alinement with the screen 10.

The middle screen 16 is also normally urged in one direction by the coil springs 20 connected thereto, these springs 20 being connected to the lugs 21 of the side walls 6 of the frame of the stop. The bottom screen 22 consists of a rectangular frame 23 carrying the cross bar 24. As suggested above, the screen frames may be provided with any other desired filtering construction, without departing from the spirit of the present invention and if so desired, the same may be square instead of rectangular or any other shape, without departing from the spirit of the present invention. The frame 22 is pivotally mounted upon the supporting bar 7 and this bottom screen is normally urged in one direction by the coil springs 27 connected to the side walls 14 of the main frame of the stop.

The guard screen 28 is substantially square, as it is considerably broader than the screens 16 and 22 and consists of a frame 29 having the filtering bars 30 connected thereto. This guard screen has coiled springs 31 connected thereto, as indicated in general at 17 to the top of the main frame of the stop. As this guard screen is retained to one side of the upper supporting bars 8 by the springs 29, the engagement of the guard screen with one side of the bar 8 will limit the movement of the guard screen in one direction. Therefore, it will be seen that the coil springs 31 will normally retain this guard screen in a horizontal plane, as suggested in Figs. 1 and 2. The flexible strands 35 are connected at their upper ends to the guard screens as indicated at 36 and at their lower ends to eyes 37 carried by the bottom screen 22.

When the device is in operation, it normally assumes the position shown in Figs. 1 and 2 and as above stated is positioned within a ditch or stream and at the head or adjacent the source thereof. Normally the screens 10, 16 and 22 are in vertical alinement with each other, while the guard screen 28 is carried in a horizontal plane. As is well known, the streams contain considerable refuse and also fish and it is very objectionable to have the fish swimming into the ditches. Under such conditions the lighter refuse floats on the surface of the stream and for this reason will pass into engagement with the top screen 10. The fish which might be in the stream swimming near the bottom or at a point below the surface of the stream will pass under the guard screen 28 and will be thus prevented from having access to the top screen 10. When a sufficient quantity of trash has been lodged against the top screen to overcome the resiliency of the coil springs 14, the top screen will be swung downwardly to a horizontal plane, thus causing the flow of water to wash the refuse past the top screen, and then the top screen will again swing to its vertical position. The fish swimming under the guard screen will of course become frightened and for this reason will swim back up the stream and will not tend to loiter near the bottom and middle screens. When the heavier trash collects against the middle screen 16 and the bottom screen 22 in sufficient quantities to overcome the tension of the coil springs 20 and 26, these two screens will swing to substantially horizontal planes as shown in Fig. 2, thus permitting the flow of water to wash the refuse therebeyond. Simultaneously with the downward swinging movement of the screen 22, it is obvious the strands 35 will be pulled downwardly. It is obvious that if so desired, instead of using flexible strands any flexible connection such as a chain or rope or the like may be employed for connecting the guard screen to the bottom screen. As these strands are pulled downwardly, they will swing the guard screen downwardly against the tension of the coiled springs 31, thus causing the guard screen to be swung to a point adjacent the bottom 5 of the main frame of the stop, thus preventing the fish swimming through the stop, while the screens 22 and 16 are in open position. Immediately upon the refuse passing beyond the middle and bottom screens, it will be seen that the tension of the coil springs 20 and 26 will return these last mentioned screens into vertical positions, and the coiled springs 31 will again return the guard screen 28 to a horizontal position.

From the foregoing description it will be seen that a very efficient fish stop has been provided to be placed in irrigating streams, ditches and the like which will prevent fish from swimming therethrough and will intermittently prevent trash from flowing through the same, although water will flow through the stop. However, when a sufficient quantity of trash lodges against the screens to overcome the tension of the coiled springs, the screens will be swung to open positions to permit the trash to pass therebeyond, although the guard screen will prevent fish beneath it from swimming through the top screen when the same moves to an open position, and when the bottom screen 22 moves to an open position, this guard screen will be swung downwardly, thus preventing fish from passing through the stop, while the bottom screen is in open position. As soon as the refuse has been washed beyond these screens by the current of the stream in which the stop is carried, it is obvious the coiled springs connected to the screens will return the screens to their normal positions after the weight and pressure of the refuse has been removed.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent, is:—

1. In a device of the class described, the combination of a main frame, a vertically extending screen hingedly mounted in said main frame, coiled springs connected to said screen for retaining the same in a set position, said screen being adapted to be swung to open positions when a quantity of refuse bears thereagainst, a guard screen carried within said main frame and extending substantially in a horizontal plane, whereby the guard screen will prevent fish from swimming upwardly toward the top of the main frame, and connections whereby said guard screen is adapted to move to prevent the fish from swimming through the lower portions of the frame when said first mentioned screen is in open position.

2. In a device of the class described, the combination of a main frame, a vertically disposed screen hingedly mounted within said main frame, coiled springs connected to said screen for resiliently holding the same in a set position, a guard screen hingedly mounted within said main frame, means connecting said guard screen to said first mentioned screen, coil springs connected to said guard screen and to said frame for normally holding said guard screen in a substantially horizontal plane whereby when said first mentioned screen is opened, said means will draw upon the guard screen for swinging the same to prevent passage through the main frame, while said first mentioned screen is opened.

3. In a device of the class described, the combination of a main frame, horizontal supporting bars carried by said main frame, screens hingedly mounted upon said supporting bars, coiled springs connected to said screens for normally urging the same in one direction, whereby said screens will be normally in vertical alinement, a guard screen hingedly mounted upon one of the bars, coiled springs connected to said guard screen for normally holding the same in horizontal position, strands connecting said guard screen to one of said first mentioned screens, said guard screen being in a plane below the top screen of the first mentioned screens, thus preventing fish from swimming up and past the first mentioned top screen when the same is in open position, and said guard screen being swung downwardly when the first mentioned screen to which the strands are connected is swung to open position, whereby trash lodged against the first mentioned screens may pass therefrom, while said guard screen will prevent the passage of fish through the main frame when it is swung downward.

4. In a device of the class described, the combination of a main frame, a vertically extending screen hingedly mounted in said main frame, a guard screen carried within said main frame and extending substantially in a horizontal plane, means for yieldably retaining said screens in normal positions, said first screen being adapted to be swung to an open position when a quantity of refuse bears thereagainst, and said guard screen normally preventing fish from swimming upwardly toward the top of the frame, and connections whereby the guard screen will move to prevent fish from passing through the lower portions of the frame when the first mentioned screen is in open position.

5. In a device of the class described, the combination of a main frame, a vertically disposed screen hingedly mounted within said main frame, a guard screen mounted within said frame, means for yieldably retaining said screens in their normal positions, means connecting said guard screen to said first mentioned screen, whereby when said first mentioned screen is opened, said means will draw upon the guard screen for swinging the same toward the position normally assumed by the first mentioned screen.

6. In a device of the class described, the combination of a main frame, horizontal supporting bars carried by said main frame, said bars having flat sides, screens hingedly mounted upon said supporting bars, a guard screen hingedly mounted upon one of said bars, means for normally urging said screens in one direction, although the screens will engage the flat surface of the bars to be limited in movement in certain directions, and strands connecting said guard screen to one of said first mentioned screens, whereby when the first mentioned screen to which said strands are connected is opened, the strands will draw upon the guard screen to move the same toward the normal position of the said first mentioned screens.

7. In a device of the class described, the combination of a main frame, horizontal supporting bars carried by said main frame, said supporting bars having flat sides, screens hingedly mounted upon said supporting bars, a guard screen hingedly mounted upon one of said supporting bars, means for yieldably urging said first mentioned screens toward vertical position and the guard toward horizontal position, although the screens will engage the flat sides of said bars to be limited in movement in certain directions, and means connecting said guard screen to one of said first mentioned screens, whereby when said first mentioned screen to which the last mentioned means are connected is moved to open position, said means will move the guard screen toward the normal positions of the first mentioned screens.

8. In a device of the class described, the combination of a main frame, a guard screen hingedly mounted within said main frame, means for normally retaining said guard screen in a horizontal position, a vertical screen carried in a plane above the horizontal screen, a vertical screen mounted within said frame in a plane below the guard screen, means for retaining said vertical screens in set positions, the first mentioned vertical screen being adapted to be swung over, although said guard screen will prevent fish from swimming past the first mentioned vertical screen when in an open position, means connecting said guard screen to the last mentioned vertical screen, whereby when said vertical screen is swung to an open position, said guard screen will be swung downwardly toward the position normally assumed by the last mentioned vertical screen, thus preventing the passage of fish through said frame.

In testimony whereof I affix my signature in presence of two witnesses.

CLAIR D. OLSON.

Witnesses:
C. K. FISHERDICK,
H. OLSON.

Copies of this patent may be obtained for five cents each, by addressing the "Commissioner of Patents, Washington, D. C."